March 18, 1924.
A. J. HALL
SYSTEM OF CONTROL
Original Filed July 19, 1917
1,486,881
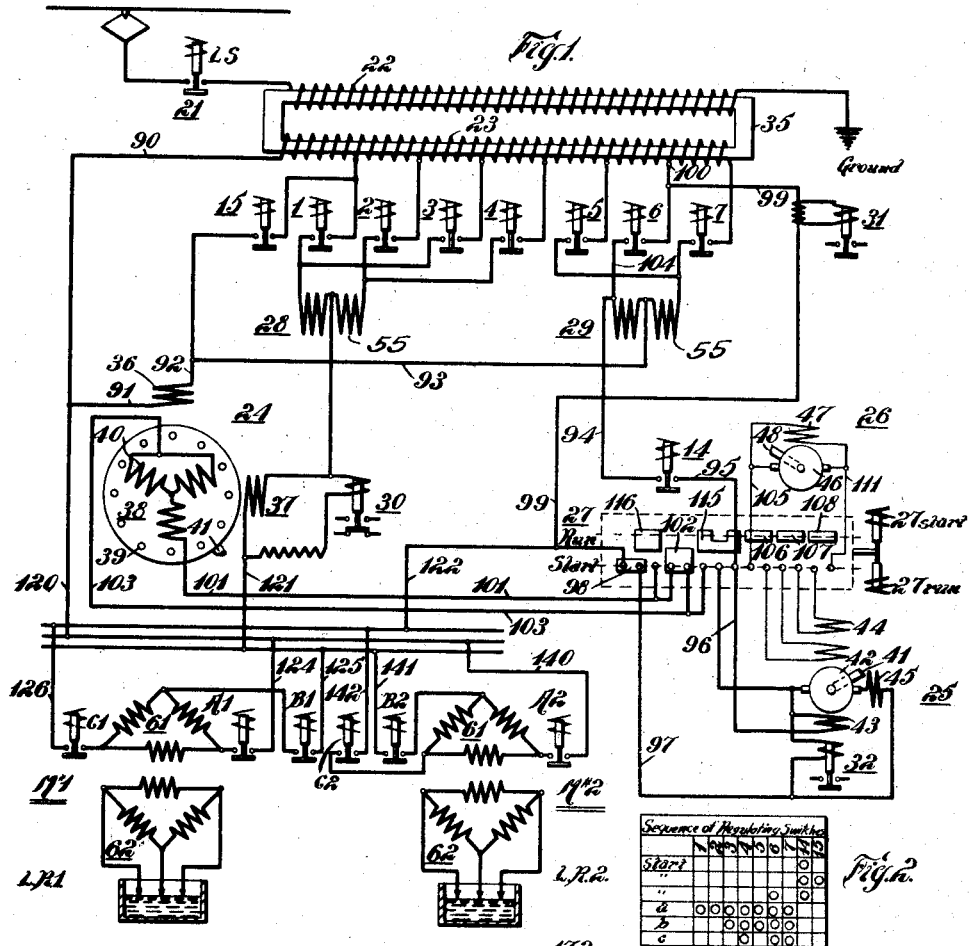
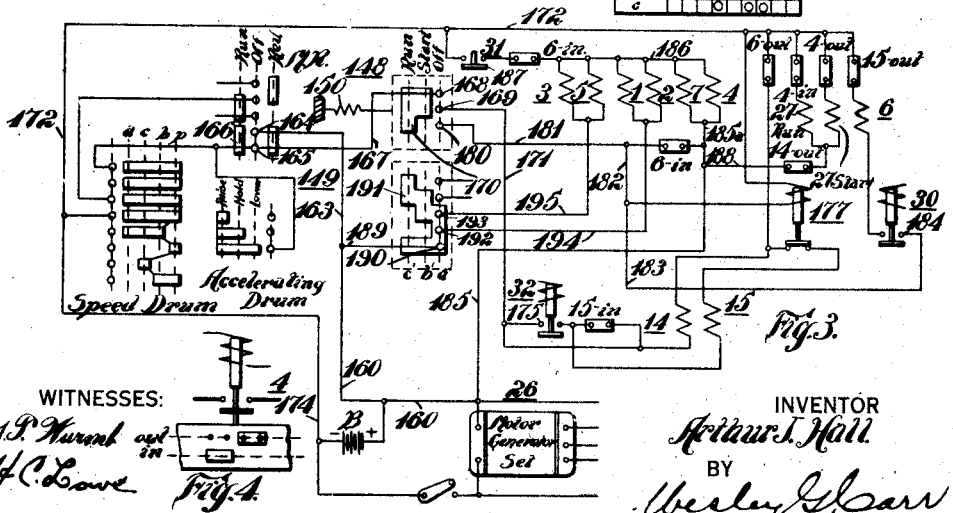
WITNESSES:
INVENTOR
Arthur J. Hall
BY
Wesley G. Carr
ATTORNEY Patented Mar. 18, 1924.

1,486,881

UNITED STATES PATENT OFFICE.

ARTHUR J. HALL, OF WILKINSBURG, PENNSYLVANIA, ASSIGNOR TO WESTINGHOUSE ELECTRIC & MANUFACTURING COMPANY, A CORPORATION OF PENNSYLVANIA.

SYSTEM OF CONTROL.

Original application filed July 19, 1917, Serial No. 181,536. Divided and this application filed May 12, 1919. Serial No. 296,486.

*To all whom it may concern:*

Be it known that I, ARTHUR J. HALL, a subject of the King of Great Britain, and a resident of Wilkinsburg, in the county of Allegheny and State of Pennsylvania, have invented a new and useful Improvement in Systems of Control, of which the following is a specification, this application being a division of application Serial No. 181,536, filed July 19, 1917.

My invention relates to control systems and especially to the control of a plurality of induction motors that are operated in conjunction with a phase-converting machine and a starting motor therefor.

One object of my invention is to provide a system of the above-indicated character wherein substantially balanced phase relations of the converting machine under different load conditions may be maintained, while the acceleration and running of the machine may be effected irrespective of the condition of the phase-balancing means.

Another object of my invention is to provide an electrically-controlled switching device having positions corresponding to the "starting" and "running" connections of a starting motor for a phase-converting machine of the above-mentioned type, together with means dependent upon the inoperativeness of the phase-converter circuits for causing the switching device to return to its "starting" position.

Other objects of my invention, directed towards the establishment of an effective and reliable control system of the class under consideration, will become evident from the following detailed description, taken in conjunction with the accompanying drawings wherein Fig. 1 is a diagrammatic view of the main circuits of a system of control embodying the invention; Fig. 2 is a sequence chart, of a well-known form, for indicating the order of operation of the various switches that are shown in Fig. 1; Fig. 3 is a diagrammatic view of one set of auxiliary governing circuits for the main system that is shown in Fig. 1; and Fig. 4 is a detailed diagrammatic view of one of the main-circuit switches.

Referring to Fig. 1, the system shown comprises suitable supply-circuit conductors Trolley and Ground; a plurality of main dynamo-electric machines or driving induction motors, two of which, M#1 and M#2, are illustrated; a plurality of secondary-circuit regulating resistors, such as liquid rheostats LR1 and LR2 for the induction motors; a main transformer 21 having a primary winding 22 and a secondary or distributing winding 23 that operates in conjunction with a phase-converting machine 24 for supplying three-phase energy to the propelling motors; a combined alternating-current starting motor and direct-current exciter 25 for the phase-converting machine 24; a motor-generator set 26 or other source of direct-current energy; a change-over switch 27 having two operative positions respectively marked "Start" and "Run" for governing the operation of the phase-converting machine and its allied auxiliary machines; a plurality of sets of preventive coils 28 and 29, or equivalent devices, for preventing current surges and short-circuits of transformer-winding sections during transition from one transformer tap to another; a plurality of relay devices 30, 31, and 32, that are connected in circuit with various portions of the main control system for governing certain auxiliary control-circuit connections, as hereinafter traced in detail; a line switch LS for connecting the primary transformer winding 22 across the supply circuit; a plurality of secondary transformer-winding switches 1 to 7, inclusive; a plurality of primary induction-motor switches A1, B1 and C1 and A2, B2, C2 are employed for connecting the primary winding of the motors M#1 and M#2, respectively, to the main transformer 21; and the phase-converting machine 24, in a manner that will hereinafter be more fully described.

The phase converter 24 comprises a primary or exciting winding 36 that is energized in phase with the secondary transformer winding 23; a secondary or induced winding 37 having approximately 86.6 per cent of the number of turns in the primary winding 36; and a rotor 38 which is provided with a squirrel-cage winding 39 to produce the well-known induction-motor action when starting the phase converter and which is also provided with a direct-current exciting winding 40 for purposes of power-factor regulation. The exciting winding 40 is connected in star relation, two of the winding legs having a common terminal, whereby a two-wire direct-current circuit may be completed from the motor-generator set 26, as hereinafter traced in detail.

The phase converter 24 is mechanically associated, by means of a shaft 41, for example, with a commutator-type armature 42 of the starting motor 25, which further comprises an alternating-current exciting field winding 43, a plural-section direct-current exciting winding 44 and a compensating or commutating field winding 45.

For the sake of simplicity and clearness, only the generator portion of the motor-generator set 26 is illustrated in Fig. 1. The preferred type of unit comprises a direct-current generating armature 46 that is provided with any suitable type of excitation, such as that supplied by a shunt field winding 47. The armature 46 is mounted upon a shaft 48 which also carries a three-phase driving motor, as indicated in Fig. 3.

The change-over switch 27 is preferably of the drum type and is provided with a plurality of actuating coils "27—Start" and "27—Run" for moving the switch into the corresponding position. The actuating coils are energized in accordance with auxiliary circuits that will be traced in connection with Fig. 3.

The change-over switch 27, in its position "Start," is adapted to effect the connection of the starting motor 25 as an alternating current series motor to the secondary transformer winding and at the same time break up the direct-current exciting winding 44 into sufficiently small sections to prevent a relatively high voltage being induced therein, in accordance with principles of operation that are familiar in the case of starting rotary converters. In the "Run" position of the change-over switch, the starting motor 25 is converted into a direct-current generator for exciting the rotor winding 40 of the phase-converter 24.

Each preventive coil 28 and 29 coprises a suitable inductive unit or winding 55, the terminals of each of which are connected to certain of the transformer switches and the mid-point, of the one coil, connected to the secondary phase-converter winding 37 and, of the other coil, to the primary converter winding 36. Since the construction and function of the preventive coils is familiar to those skilled in the art, no further description thereof is deemed necessary here.

The converter-secondary-winding relay 30 is connected through a suitable voltage-reducing resistor across the secondary winding 37 of the phase-converting machine for the purpose of lifting to close certain auxiliary circuits, as subsequently traced in Fig. 3, only after the phase converter has attained substantially full speed and voltage conditions.

During operating periods, whenever the phase-converter voltage supply is interrupted, the relay 30 acts similarly to a time-element device, since a period of 5 or 6 seconds elapses before the voltage of the secondary winding 37 decreases to such a value that the relay device is allowed to drop. Thus, ordinary bouncing of the trolley or pantograph or the passage thereof under a section break will not cause an interruption of the auxiliary circuits that are governed by the relay 30.

The current relay 31 is adapted to complete certain auxiliary-circuit connections whenever normal voltage conditions obtain in the supply-circuit transformer 21, the relay opening upon an interruption of supply-circuit voltage.

The starting-motor relay 32 is energized by the voltage of the starting-motor 25, and when in its upper position, the relay closes certain auxiliary circuits to be set forth.

Each of the driving induction motors M#1, M#2, etc., comprises a star-connected primary or stator winding 61 and a delta-connected secondary or rotor winding 62. The liquid rheostats LR1 and LR2 are employed to vary the resistance in circuit with the secondary windings 62 of the motors M#1 and M#2, respectively. Their operations are well known and will not be further described.

Assuming that the line switch LS has been closed to energize the primary transformer winding 22, the operation of the illustrated system may be set forth as follows: as indicated by the sequence chart Fig. 2, switch 14 is first closed, whereby a circuit is established from the left-hand terminal of the secondary transformer winding 23 through conductors 90 and 91, primary phase-converter winding 36, conductors 92 and 93, preventive coil 29, conductor 94, switch 14, conductors 95 and 96, alternating-current exciting field winding 43, armature 42 and compensating field winding 45 of the starting motor 25, conductor 97, contact segment 98 of the change-over switch 27 in its position "Start," and conductor 99 to a second terminal-point 100 of the transformer winding 23. The starting motor 25 is thus connected in series relation with the primary phase converter winding 36 across the major portion of the supply-circuit transformer secondary winding.

During such starting operation, the exciting winding 40 of the phase converter 24 is short-circuited through conductor 101, contact member 102 of the change-over switch 27 and conductor 103, whereby an induction-motor action supplemental to that of the squirrel-cage winding 39 is provided during the starting period.

The switch 15 is closed during the starting operation to impress a definite voltage from a section of the transformer winding 23 upon the primary converter winding 36, thereby insuring the rapid building-up of the secondary converter voltage in the winding 37.

After a certain time interval, the change-over switch 27 is actuated to its position "Run" by reason of the energization of the actuating coil 27—Run, as subsequently traced in detail, whereupon a direct-current circuit is established from the positive terminal 105 of the generating armature 46 of the motor-generator set 26 through conductor 105 and a plurality of contact segments 106 to 108, inclusive, which bridge certain sets of stationary contact members that are connected to the various sections of the direct-current exciting winding 44, whence circuit is completed through conductor 111 to the negative terminal of the armature 46. The former starting motor 25 thus becomes a direct-current generator that is driven by the phase-converter 24.

During the transitional movement of the change-over switch, the alternating-current exciting field winding 43 is temporarily short-circuited to prevent undesirable current or voltage surges.

The exciting circuit for the phase converter 24 is thereupon established from the positive terminal of the former starting-motor armature 42 through exciting field winding 43, conductor 96, contact member 115 of the change-over switch 27, conductor 103, exciting rotor winding 40 of the phase-converter, conductor 101, contact segment 116 of the change-over switch, conductor 97 and communicating field winding 45 to the negative terminal of the armature 42. In this way, the phase-converter 24 is provided with direct-current rotor excitation during operation thereof to provide a desired corrective action with respect to the power-factor.

Under full operating conditions of the phase-converter, a three-phase voltage obtains between conductors 120, 121 and 122, which are respectively connected to the conductor 90, the outer terminal of the phase-converter secondary winding 37 and the conductor 99. Upon the closure of switches A1, B1 and C1, energy is conveyed to the respective phase windings of the primary winding 61 of the induction motor M#1 from conductors 124, 125 and 126, which are respectively connected to the three-phase supply conductors 120, 121 and 122.

Upon the closure of switches A2, B2 and C2, energy is conveyed to the winding 61 of the motor M#2 from conductors 140, 141 and 142, which are respectively connected to the three-phase supply conductors 120, 121 and 122.

The function of the switches 1 to 7, inclusive, is to correct for phase distortions in the three-phase circuit under different conditions of load and also to compensate for the change from accelerating to regenerative operation, whereby a substantially balanced three-phase voltage may be obtained under substantially all operating conditions. Since such regulation is familiar to those skilled in the art, no detailed description thereof is necessary here. It is deemed sufficient to state that the point of connection of the secondary phase-converter winding 37 to the transformer winding 23 is varied along a predetermined intermediate section of the transformer winding, while the connection of the upper terminal of the primary phase-converting winding 36 to the right-hand portion of the transformer winding 23 is also changed to suit operating conditions.

Referring to Fig. 3, the auxiliary system shown comprises the actuating coils of the various switches of Fig. 1 and interlocking contact members thereof of the familiar type that is illustrated in Fig. 4, together with cooperating contact members of the several relays; a starting switch 148 for the phase-converter, having positions "Off", "Start" and "Run"; a phase-balancing switch 149 having positions $a'$, $b'$ and $c'$ for regulating the various transformer secondary-winding switches 1 to 7, inclusive; a speed drum having running positions $c$ and $p$, corresponding to cascade and parallel connection of the sets of motors; an accelerating drum having positions "Lower," "Hold" and "Raise" for primarily governing the operation of the liquid-rheostat actuating mechanisms (not shown.) A master reverser MR for governing the direction of rotation of the driving induction motors; and a suitable auxiliary source of energy, such as a battery B, which may be charged from the illustrated motor-generator set.

Assuming that it is desired to effect operation of the phase-converter 24, the starting switch 149 may be moved to its position "Start" in opposition to the action of a biasing spring 150, whereby a circuit is established from the positive terminal of the battery B through conductors 160 and 163, control fingers 164 and 165 which are bridged by contact segment 166 of the master reverser MR in its forward position. conductor 167, control fingers 168 and 169 which are bridged by contact segment 170 of the phase-converter starting switch 148, conductor 171, the actuating coil of the switch 14, interlock 16—out and conductors 172 and 174 to the negative battery terminal.

As soon as the starting motor 25 has been set into operation in the previously described manner by the closure of the switch 14 and the relay 32 has, therefore, been raised to its upper or circuit-closing position, a further circuit is completed from the conductor 171 through co-operating contact members 175 of the relay 32, the actuating coil of the switch 15, co-operating contact members 176 of an auxiliary relay 177 in its lower position and interlock 16—out to the negative battery conductor 172. As soon as the switch 15 has closed, a holding circuit for its actuating coil is formed by the bridging of the co-operating contact members 175 of the relay 32 by interlock 15—in.

By manually actuating the phase-converter starting switch 148 to its position "Run," after a suitable interval of time, a further circuit is completed from the contact segment 170 thereof through control finger 180, conductors 181 and 182 and the actuating coil of the auxiliary relay 177 to conductor 172. Thus, the relay 177 is lifted to its upper position to open-circuit the actuating coil of the switch 15. Thereupon, a further circuit is completed from the conductor 182, through conductor 183, co-operating contact members 184 of the converter-secondary-winding relay 30 in its upper position, the actuating coil of the switch 6, interlock 15—out and conductor 172 to the negative battery terminal.

A new circuit is thereby completed from the positive battery conductor 160 through conductors 185 and 185a, the parallel-related actuating coils of the switches 4 and 11, conductor 186, interlock 6—in, the co-operating contact members 187 of the current relay 31 in its upper position and negative battery conductor 172.

The closure of the switch 6 effects the opening of the switch 14 by reason of the exclusion of the interlock 6—out from the energizing circuit of the actuating coil for the switch 14, whereby a further circuit is established from the positively-energized conductor 185 through conductor 188, interlock 14—out, actuating coil 27—Run of the change-over switch 27 and interlock 4—in to negative conductor 172. The change-over switch 27 is thus actuated to its position "Run" and the energizing or "holding" circuit is independent of the phase-converter starting switch 148 which may, therefore, be released by the train operator and is returned to the "Off" position by the spring 150.

However, if the supply-circuit energy or the battery energy is interrupted to effect the opening of the switches 4 and 7 by the opening of the current relay 31 in the case of inoperativeness of the polyphase circuits, then the change-over switch 27 is automatically returned to its "Start" position by reason of the completion of a circuit from the interlock 14—out through the actuating coil 27—Start and interlock 4—out to the negative conductor 172. In this way, the change-over switch 27 is electromagnetically actuated to its "Run" position under certain relative or interlocked conditions of various other circuits and is automatically returned to its "Start" position upon an interruption of main or auxiliary-circuit energy.

If the phase-balancing switch 149 occupies the illustrated position $a'$, a circuit is established, as soon as the switch 10 is closed, from the positively energized battery conductor 160 through conductor 189 and control finger 190 to contact segment 191 of the balancing switch. Control fingers 192 and 193 are thereby energized, a circuit being continued from control finger 192 through conductor 194, the parallel-related actuating coils of the switches 1, 2 and 8 and thence through conductor 186 and the interlock 6—in as already traced. A further circuit is established from the control finger 193 through conductor 195, and the parallel-related actuating coils of the switches 3 and 9 to the conductor 186. Thus, a predetermined regulation of the phase-converter to correct for secondary-voltage distortion is effected. In positions $b'$ and $c'$ of the balancing switch 149, a plurality of switches (not shown in Figs. 1 and 2 for the sake of clearness) are closed, under the proper interlocking conditions, to compensate for the above-mentioned phase distortion under different load conditions. After the phase converter is operating under full speed and voltage conditions, the speed drum may be actuated to effect closure of the switches A, B and C and A2, B2 and C2 of the motors M#1 and M#2, respectively, and the accelerating drum actuated to operate the liquid rheostats LR1 and LR2.

I do not wish to be restricted to the specific circuit connections or arrangement of parts herein set forth, as various modifications thereof may be effected without departing from the spirit and scope of my invention. I desire, therefore, that only such limitations shall be imposed as are indicated in the appended claims.

I claim as my invention:

1. In a system of control, the combination with an alternating-current supply circuit and an electrical load, of a phase-converter interposed between said supply circuit and said load, a starting motor for said phase-converter, a plural-position switching device for effecting starting connections of the motor in one position and different running connections of the motor in another position, and means, dependent upon inoperativeness of the phase-converter circuits, for actuating said switching device to the starting position.

2. In a system of control, the combination with an alternating-current supply circuit and an electrical load, of a phase-converter interposed between said supply circuit and said load, a starting motor for said phase-converter, a switching device having positions corresponding to "starting" and "running" connections of the starting motor, electrically - controlled, power - operated means for actuating said switching device to the one or the other position, and means dependent upon inoperativeness of the phase-converter circuits for energizing said electrically-controlled means to return the switching device to the "starting" position.

3. A system of control comprising a single-phase transformer winding, a three-phase driving induction motor, a phase-converter for changing single-phase into three-phase energy, a starting motor for said phase-converter, a main switching device having positions corresponding to "starting" and "running" connections of the starting motor, a plurality of actuating coils for effecting the movement of said switching device to the one or the other position, manual means for energizing the "running" coil of said switching device to complete the acceleration of said starting motor and interlocking means dependent upon inoperativeness of the phase-converter circuits for energizing the "starting" coil and de-energizing the "running" coil to return said switching device to its "starting position.

4. A system of control comprising a single-phase transformer winding, a three-phase driving induction motor, a phase-converter for changing single-phase into three-phase energy, a starting motor for said phase-converter, a main switching device having positions corresponding to "starting" and "running" connections of the starting motor, a plurality of actuating coils for effecting the movement of said switching device to the one or the other position, a plurality of switches for governing the connections of said transformer winding to the remainder of the system, a manual controller adapted in one operative position to effect the closure of one of said switches to complete a circuit through the "starting" position of said switching device and through said starting motor and adapted in a second operative position to energize the "running" coil of said switching device to complete the acceleration of said starting motor, means for thereupon automatically closing certain other governing switches, interlocking means dependent upon the closure of one of said certain switches for establishing a "holding circuit" for said "running" coil, and interlocking means dependent upon the opening of one of said certain switches for energizing the "starting" coil and de-energizing the "running" coil to return said switching device to its "starting" position.

5. A system of control comprising a single-phase transformer winding, a polyphase driving induction motor, a phase-converter having a primary and a secondary winding for changing single-phase into polyphase energy, a starting motor for said phase-converter, a main switching device having positions corresponding to "starting" and "running" connections of the starting motor, manual means for effecting the connection of said starting motor through said switching device to said transformer winding, and a relay governed by the electrical condition of said starting motor for effecting the connection of said primary phase-converter winding across a portion of said transformer winding.

6. A system of control comprising a single-phase transformer winding, a polyphase driving induction motor, a phase-converter having a primary and a secondary winding for changing single-phase into polyphase energy, a starting motor for said phase-converter, a main switching device having positions corresponding to "starting" and "running" connections of the starting motor, manual means for effecting the initial connection of said starting motor through said switching device and said primary winding across a major portion of said transformer winding, and a relay governed solely by the electrical condition of said starting motor for effecting the connection of said primary winding directly across a minor portion of the transformer winding when the starting motor has started into operation, whereby the secondary voltage of the phase-converter is rapidly built up.

In testimony whereof, I have hereunto subscribed my name this 29th day of April, 1919.

ARTHUR J. HALL.